UNITED STATES PATENT OFFICE.

GEORGE LEONARD BORROWMAN, OF NEW ROCHELLE, NEW YORK.

WATER-SOFTENING COMPOUND AND METHOD OF PRODUCING SAME.

1,348,977.  Specification of Letters Patent.  Patented Aug. 10, 1920.

No Drawing. Application filed June 2, 1916, Serial No. 101,248. Renewed May 8, 1919. Serial No. 295,703.

*To all whom it may concern:*

Be it known that I, GEORGE LEONARD BORROWMAN, citizen of the United States, residing at New Rochelle, in the county of Westchester and State of New York, have invented certain new and useful Improvements in Water-Softening Compounds and Methods of Producing Same; and I do hereby declare the following to be a full, clear, and exact description of the invention, such as will enable others skilled in the art to which it appertains to make and use the same.

This invention has for its object to provide a method for treating green sand or glauconite to better adapt the same for water-softening and ready regeneration with common salt brine, and relates further to the product of said method.

Green sand is commonly found in a marl, which consists of glauconite and ordinary sand, and sometimes other impurities. Glauconite is substantially a hydrous silicate of iron and potash. This in its natural state is well adapted to the softening of water by effecting an exchange of bases. That is, if the water contains lime or magnesia (hardening salts), calcium and magnesium will be removed by the glauconite by filtration unless the latter is already saturated with these substances from previous contact with hard water.

The reaction involved is an exchange of bases, that is to say, the calcium and magnesium of the water change places with the potassium of the sand. But this reaction is limited to the surface of the glauconite particles and when all of this surface has reacted with the hardening salts, the sand must be regenerated. This is effected by subjecting the glauconite to the action of a solution of a potassium salt such as potassium chlorid and subsequent rinsing. The glauconite is then again in its original condition and this performance may be repeated indefinitely, the reactions being instantaneous.

If salammoniac be used as the regenerating agent, the result will be that each grain of glauconite will be coated with an ammonium iron silicate, instead of presenting a solid mass of the potassium compound, and this coating will constitute the water-softening agent.

The natural glauconite is an amorphous, colloid-like substance containing water in chemical combination.

It is desirable to use common salt-brine as a regenerating agent in place of either of the aforesaid chemicals for the reason that it is cheap, easily obtained and easily handled by unskilled persons. But the natural glauconite does not readily lend itself to this brine regeneration as the sodium chlorid solution appears to affect the material to soften it and render it unable to withstand the friction of water filtration and renders the water passed through the glauconite mass undesirably muddy.

The object of the present invention is, therefore, to effect such change in the glauconite as will render it better suited to the purpose of softening water and will adapt it to regeneration with salt-brine.

As before stated, glauconite is a hydrous silicate of iron and potassium and is green in color. I find that by gradually heating it to a temperature ranging from about 200° C. to 400° C. and then allowing it to cool, its physical condition is materially changed. The change probably begins below 200° C. and continues above 400° C. That is, its physical stability is increased, its color is changed from green to yellow-green, brown or black, depending upon the temperature to which it is subjected, and the condition of the baking air. The heat also partially dehydrates it so that upon moistening it when cool, heat is generated, indicating that re-hydration takes place. It also reacts with sodium chlorid (common salt) solution as well as with potassium chlorid and ammonium chlorid and quite as satisfactorily as with the last-named chemicals. It also (before rehydration) has a higher specific gravity and contains less water in combination. It also becomes more compact and denser, probably by coagulation or "setting" of the amorphous colloid-like substance.

If the temperature is carried too high this rehydration does not occur.

In the baking process all other materials present (such as organic matter) which are either volatile or unstable at the temperature used, will be expelled or changed, but these changes I do not deem important or essential.

When common salt-brine is used for regenerating the baked glauconite, the active softening agent is a superficial layer of sodium iron silicate on each grain, the bulk of the latter remaining the original potassium compound.

Preferably after cooling, the baked glauconite is first washed with water and then treated with a salt brine. After rinsing this out it is ready for use as a water-softening agent through which hard water is filtered, and thereafter salt-brine may be used repeatedly for regeneration.

The baked glauconite differs from the unbaked physically in being denser and harder; chemically in having less water in combination and less volatile matter vaporizable at the temperature employed. On wetting the same some, if not all, of the water removed in baking is replaced, but the physical condition does not revert to the original state.

I claim as my invention:

1. A new product of manufacture consisting of a baked natural base exchange silicate adapted in its natural and stabilized states respectively to soften hard water brought in surface contact therewith and to be regenerated by contact with a sodium-chlorid solution after its water-softening powers have been wholly or partially exhausted by contact with hard water, the baked product being distinguished from the natural in that it resists the powdering action of water and delivers clear soft water.

2. The method of producing a water softening material capable of delivering soft water which consists in stabilizing a natural base exchange silicate by baking whereby it is rendered capable of resisting the powdering action of water flowing in contact therewith.

3. As a new product of manufacture, a water-softening agent consisting of baked glauconite.

4. As a new product of manufacture, a water-softening agent consisting of glauconite baked at a temperature ranging from a minimum of approximately 200° C. to a maximum of approximately 400° C.

5. As a new product of manufacture, a zeolite water softener consisting of dehydrated rehydrated glauconite adapted for regeneration with common salt brine.

6. The hereindescribed method of producing a water-softening compound which consists in subjecting glauconite to a temperature sufficient to dehydrate the same and then cooling the same.

7. The hereindescribed method of producing a water-softening compound which consists in heating glauconite gradually to a temperature of approximately 200° C. to 400° C. and then allowing the same to cool.

8. The hereindescribed method of producing a water-softening compound which consists in subjecting glauconite to a temperature sufficient to dehydrate the same, then cooling the same, then washing it, and thereafter subjecting it to the action of salt brine.

9. The hereindescribed method of producing a zeolite water softener adapted for regeneration with common salt brine which consists in subjecting glauconite to heat of sufficient intensity and for a sufficient period to effect dehydration thereof, then cooling and rehydrating the same.

10. A water-softening zeolite adapted to be regenerated with common salt brine which consists of glauconite which has been dehydrated by heat and subsequently rehydrated.

11. A water-softening zeolite consisting of glauconite, stabilized to resist the powdering action of water.

12. A water-softening zeolite consisting of glauconite, stabilized by heat.

13. A new product of manufacture consisting of a baked natural base exchange silicate adapted in its natural and stabilized states to soften hard water brought in contact therewith and to be regenerated by a salt solution after its water-softening powers have been wholly or partially exhausted by contact with hard water, the baked product being distinguished from the natural in that it resists the powdering action of water.

In testimony whereof I have signed my name in presence of two subscribing witnesses.

GEORGE LEONARD BORROWMAN.

Witnesses:
M. H. POWER,
J. B. BURNETT.